(12) United States Patent
Galli

(10) Patent No.: US 7,143,059 B2
(45) Date of Patent: Nov. 28, 2006

(54) MANAGING STOCK AVAILABLE TO ON-LINE AND IN-PERSON SHOPPERS

(75) Inventor: Doreen Lynn Galli, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 10/032,746

(22) Filed: Oct. 23, 2001

(65) Prior Publication Data

US 2003/0078847 A1   Apr. 24, 2003

(51) Int. Cl.
G06Q 10/00 (2006.01)
G06Q 30/00 (2006.01)
(52) U.S. Cl. .......................................... 705/28; 705/26
(58) Field of Classification Search .................. 705/26, 705/27, 28, 10, 5, 22
See application file for complete search history.

(56) References Cited

U.S. PATENT DOCUMENTS

| | | | | |
|---|---|---|---|---|
| 4,656,463 A * | 4/1987 | Anders et al. | ............ | 340/573.4 |
| 4,866,661 A * | 9/1989 | de Prins | ............ | 235/382 |
| 5,299,115 A | 3/1994 | Fields et al. | ............ | 364/401 |
| 5,390,107 A | 2/1995 | Nelson et al. | ............ | 364/401 |
| 5,504,589 A | 4/1996 | Montague et al. | ............ | 358/403 |
| 5,592,378 A | 1/1997 | Cameron et al. | ............ | 395/227 |
| 5,608,621 A * | 3/1997 | Caveney et al. | ............ | 705/10 |
| 5,878,401 A | 3/1999 | Joseph | ............ | 705/22 |
| 5,897,624 A * | 4/1999 | Ramaswamy | ............ | 705/28 |
| 5,909,023 A | 6/1999 | Ono et al. | ............ | 235/380 |
| 5,918,211 A | 6/1999 | Sloane | ............ | 705/16 |
| 5,933,813 A | 8/1999 | Teicher et al. | ............ | 705/26 |
| 6,006,196 A * | 12/1999 | Feigin et al. | ............ | 705/10 |
| 6,026,372 A | 2/2000 | Savage | ............ | 705/15 |
| 6,032,125 A | 2/2000 | Ando | ............ | 705/10 |
| 6,032,127 A | 2/2000 | Schkolnick et al. | ............ | 705/23 |
| 6,076,071 A * | 6/2000 | Freeny, Jr. | ............ | 705/26 |
| 6,141,006 A | 10/2000 | Knowlton et al. | ............ | 345/335 |
| 6,205,431 B1 * | 3/2001 | Willemain et al. | ............ | 705/10 |
| 6,298,972 B1 * | 10/2001 | Tedesco et al. | ............ | 194/217 |
| 6,327,573 B1 * | 12/2001 | Walker et al. | ............ | 705/14 |

(Continued)

FOREIGN PATENT DOCUMENTS

JP        411154280 A  *  6/1999

OTHER PUBLICATIONS

Yahoo web page, http://web.archive.org/web/20010504195729/yahoo.com/ , archived May 4, 2001.*

*Primary Examiner*—Steven B. McAllister
(74) *Attorney, Agent, or Firm*—John R. Pivnichny; David R. Irvin

(57) ABSTRACT

A method for managing stock so that a merchant who provides both on-line and in-person shopping may dependably advise an on-line shopper regarding availability of an item. An approximate quantity available of the item is determined, and then adjusted according to an estimate of the quantity of the item held before checkout by in-person shoppers. When the result is less than a threshold, corrective action is invoked. The corrective action may be prompting the on-line shopper to select an alternative item, asking the on-line shopper to submit an order immediately, monitoring the approximate quantity during the on-line shopping session and informing the on-line shopper if the approximate quantity falls below a second threshold, and instructing an in-house shopping assistant to reserve the item for the on-line shopper.

8 Claims, 2 Drawing Sheets

U.S. PATENT DOCUMENTS

| | | |
|---|---|---|
| 6,446,045 B1 * | 9/2002 | Stone et al. .................. 705/26 |
| 6,615,714 B1 * | 9/2003 | Miyazaki ..................... 101/35 |
| 2001/0027418 A1 * | 10/2001 | Johnson ....................... 705/22 |
| 2002/0038266 A1 * | 3/2002 | Tuttrup et al. ................ 705/28 |
| 2002/0147651 A1 * | 10/2002 | Hoar et al. ................... 705/22 |
| 2003/0046173 A1 * | 3/2003 | Benjier et al. ................ 705/26 |

* cited by examiner

MANAGING STOCK AVAILABLE TO ON-LINE AND IN-PERSON SHOPPERS

FIELD OF THE INVENTION

The present invention applies generally to the field of electronic commerce, and more particularly to a method for managing stock of an item that may be put into an electronic shopping cart by an on-line shopper at roughly the same time that it is put into a physical shopping cart by an in-person shopper.

BACKGROUND

One of the many conveniences of electronic commerce, in particular on-line shopping, is immediate confirmation that a desired item is, or is not, immediately available from stock. To provide this information, an on-line merchant uses data processing equipment to keep inventory records. Each time a unit of a particular item is sold, the number of that item remaining in inventory is reduced in the inventory record.

When an on-line shopper requests or orders an item from the on-line merchant, for example by including the item in an electronic shopping cart, the merchant's data processing system checks the inventory record concerning that item. If the inventory record shows that the item is not in stock, the on-line shopper is informed, and the order is rejected, or accepted with the stipulation that shipping of the item will be delayed; if the inventory record shows that the item is in stock, the order is accepted unconditionally.

On occasion, an on-line merchant may accept an order that cannot be filled because the stock of the item is depleted, despite an incorrect inventory record showing otherwise. When this happens, the on-line shopper may be dissatisfied by the shopping experience. So, not only is the merchant unable to profit from selling the particular item ordered by the on-line shopper, the merchant also risks offending a customer. Consequently, it is important that an item in fact be in stock when the merchant accepts an on-line order.

Tracking stock and providing accurate reports of item availability become significantly more difficult when a merchant provides both on-line and traditional in-person shopping. Enterprises of this kind have recently become known as "click and mortar," where "click" suggests on-line shopping where a shopper uses a computer mouse to put an item into an electronic shopping cart, and "mortar" suggests traditional in-person shopping where a shopper puts an item into a physical shopping cart or otherwise takes physical charge of the item before checkout.

A problem arises when an in-person shopper engages in a prolonged shopping session. The in-person shopper may remove an item from stock, put the item in his or her shopping cart, and then continue shopping for quite some time. When the in-person shopper finally checks out, the inventory record concerning the selected item is brought up to date. In the meantime, however, the inventory record is incorrect, and may sometimes show that an item is available when in fact the last unit of the item has been taken from stock and put into a physical shopping cart by an in-person shopper.

For the duration of the in-person shopping session, which in practice may easily reach thirty minutes, an on-line shopper may place an order for the same item held by an in-person shopper, and be assured by the merchant that the item is available from stock. Only too late the merchant finds that the item ordered by the on-line shopper is in fact not available, and must inform the on-line shopper that the order cannot be filled after all.

When this happens, the on-line shopper may become dissatisfied with the merchant and with on-line shopping in general. Consequently, there is a need for a way of determining whether an item offered for sale to both on-line and in-person shoppers is in stock, rather than in the physical shopping cart of an in-person shopper, when a merchant accepts an on-line order for that item, so that a merchant may correctly advise the on-line shopper regarding the availability of the item from stock.

SUMMARY

The present invention provides a way of tracking stock so that a merchant who provides both on-line and in-person shopping may dependably advise an on-line shopper regarding the from-stock availability of an item requested or ordered.

In one embodiment of the invention, the merchant determines an approximate quantity available of an item that may be purchased by an on-line shopper, and adjusts the approximate quantity according to a quantity-held estimate that reflects the quantity of the item in pre-checkout possession of in-person shoppers. The approximate quantity may be determined from inventory records; the quantity-held estimate may be the average number of the item that has been historically purchased by in-person shoppers over a predetermined period of time, for example the average number of the item historically purchased by in-person shoppers over a thirty-minute period. In other embodiments of the invention, the quantity-held estimate may have finer granularity, or may be dependent upon the time of day, day of the week, season of the year, or proximity to the occurrence of a holiday or a special season such as "back to school."

In another embodiment of the invention, the merchant identifies an item requested by an on-line shopper; determines the approximate quantity of the item available according to an inventory record; adjusts the approximate quantity in response to a quantity-held estimate that reflects the quantity of the item in pre-checkout possession of in-person shoppers, to provide an adjusted quantity; compares the adjusted quantity to a threshold; and, when the adjusted quantity is less than the threshold, invokes a corrective action. In various embodiments of the invention, the corrective action may include, for example, prompting the on-line shopper to select an alternative to the item, asking the on-line shopper to submit an order immediately so that the item may be removed from stock and set aside on behalf of the on-line shopper, monitoring the approximate quantity during the course of the on-line shopping session and informing the on-line shopper if the approximate quantity indicates that the item has become unavailable, instructing an in-house shopping assistant to reserve the item for the on-line shopper, and so forth.

Thus the invention provides a way for a merchant to better advise an on-line shopper concerning the from-stock availability of an item selected or ordered by the on-line shopper, when the item may be removed from stock by an in-person shopper and held for a significant period of time during which its inventory record is incorrect. These and other aspects of the invention will be more fully appreciated when considered in light of the following drawings and detailed description.

DETAILED DESCRIPTION

The present invention enables a merchant who provides both on-line and in-person shopping to advise on-line shoppers concerning the availability of items that may be removed from stock by in-person shoppers.

Figure 1:
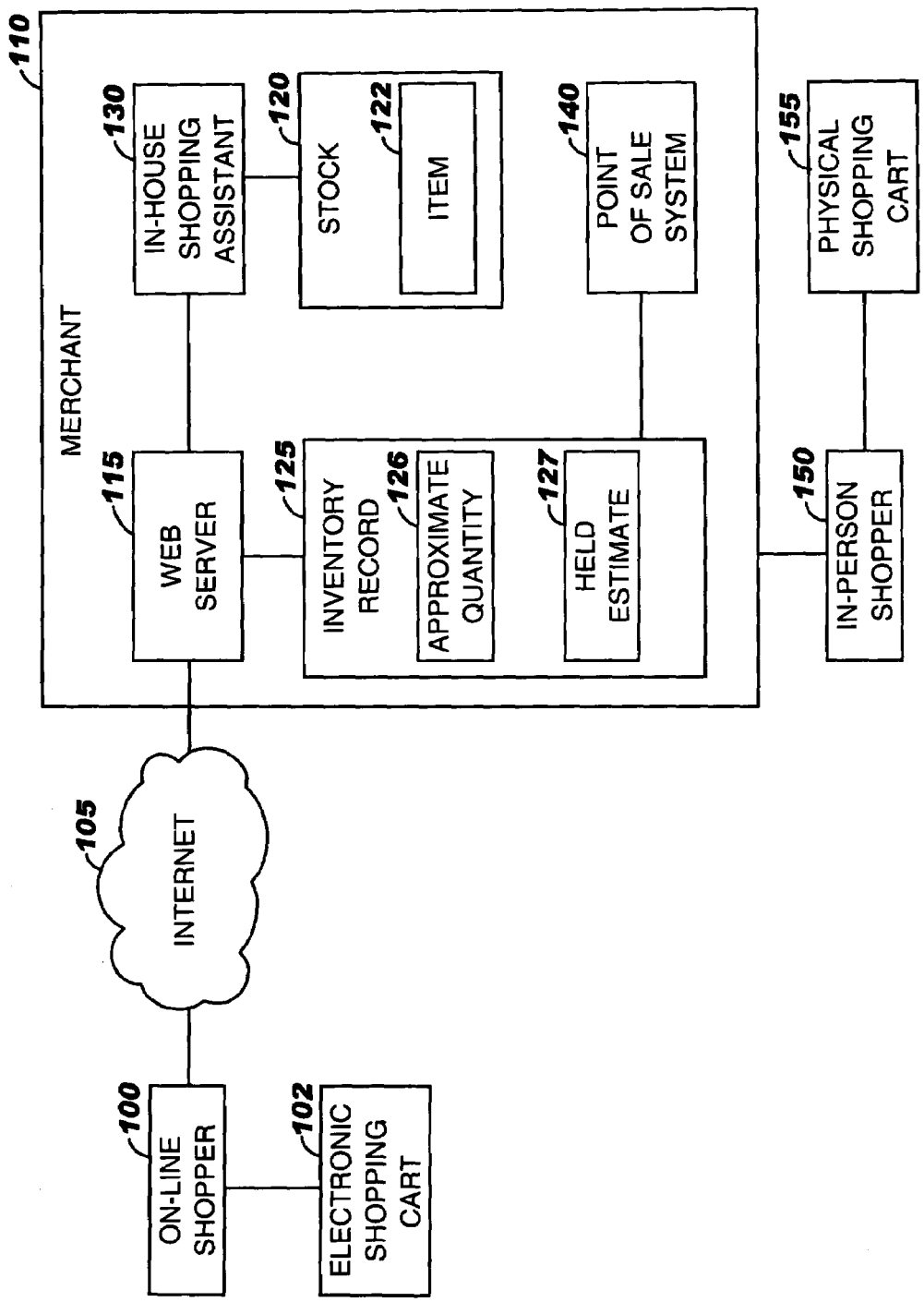
FIG. 1 shows an exemplary structure that includes a "click and mortar" merchant according to the present invention, an on-line shopper, and an in-person shopper.

In FIG. 1, an on-line shopper 100 is connected via the Internet 105 or other communication network to a "click and mortar" merchant 110 who provides both in-line and in-person shopping. The merchant 110 includes a Web server 115 or equivalent equipment, a stock 120 of items for sale, and an inventory record 125 concerning the stock 120. When the on-line shopper 100 orders an item 122 from the stock 120, the server 115 receives the order, and notifies an in-house shopping assistant 130, who may be a human or an automaton, to retrieve the item 122 from the stock 120, package the item 122, and ship the item 122 to the on-line shopper 100. Although FIG. 1 shows a single on-line shopper 100 for clarity of description, the present invention applies as well when a plurality of on-line shoppers access the merchant 110.

The merchant 110 also may include a point-of-sale system 140 to accept purchases from an in-person shopper 150. The in-person shopper 150 may visit the merchant 110, remove the item 122 from stock 120, put the item 122 into a physical shopping cart 155 or otherwise take physical charge of the item 122, and checkout using the point-of-sale system 140. Although FIG. 1 shows a single in-person shopper 150 for clarity of description, the present invention applies as well when a plurality of in-person shoppers visit the merchant 110.

The inventory record 125 contains the approximate quantity 126 of the item 122 in the stock 120. For example, when the item 122 is first offered for sale, the stock 120 may have 200 units of the item 122. Each time the server 115 accepts an on-line order from an on-line shopper such as the on-line shopper 100, the approximate quantity 126 is decreased by the quantity of the item 122 ordered. Also, when an in-person shopper such as the in-person shopper 150 checks out, for example through the point-of-sale system 140, the point-of-sale system 140 or other means decreases the approximate quantity 126 in the inventory record 125 by the number of the item 122 sold. Thus the approximate quantity 126 in the inventory record 125 is roughly the number of units of the item 122 actually present in the stock 120 at a given time, and is called here the approximate quantity 126 of the item 122 that is available for purchase by the on-line shopper 100.

A problem arises when the in-person shopper 150 removes the item 122 from the stock 120, places the item 122 in the physical shopping cart 155 or otherwise takes charge of the item 122, but does not checkout promptly. In such circumstances, the approximate quantity 126 will be off by the number of units of the item 122 held pre-checkout by in-person shoppers such as the in-person shopper 150. Based on the incorrect approximate quantity 126, the merchant 110 may accept an on-line order from the on-line shopper 100 for the item 122, and may improperly advise the on-line shopper 100 that the item 122 is then available from the stock 120.

In order to enable the merchant 110 to more accurately advise the on-line shopper 100 regarding the availability of the item 122 from the stock 120, the point-of-sale system 140, or other logic or means within the merchant 110, provides a quantity-held estimate 127, i.e., an estimate of the number of units of the item 122 held pre-checkout by in-person shoppers such as the in-person shopper 150 of FIG. 1. For example, the quantity-held estimate 127 may be an estimate of the number of units of the item 122 held in physical shopping carts such as the physical shopping cart 155 of FIG. 1. The quantity-held estimate 127 may be stored as part of the inventory record 125, and thereby made readily available to the server 115. In one embodiment of the invention, the quantity-held estimate 127 may be the average number of units of the item 122 purchased in the past by in-person shoppers such as the in-person shopper 150 over a predetermined period of time. For example, the point-of-sale system 140 may have in the past checked out, on average, five units of the item 122 during any fifteen-minute period, where fifteen minutes may be the average duration of an in-person shopping session. In this case, the quantity-held estimate 127 of the item 122 would be five. Although this example uses a simple numerical average as the quantity-held estimate 127 for clarity of illustration, the invention encompasses as well quantity-held estimates based on more advanced techniques of time-series analysis, including various smoothing methods applied to historical records, prediction based on autocorrelation and crosscorrelations, and so forth, including estimates provided by the methods disclosed in U.S. Pat. No. 5,299,115, "Product Demand System and Method," the entirety of which is hereby incorporated herein by reference.

In another embodiment of the invention, the quantity-held estimate 127 may be kept as a function of time of the day, day of the week, or both, and so forth. Further, the quantity-held estimate 127 may be kept as a function of other parameters, and may be, for example, adjusted by proximity to a holiday such as Christmas or otherwise seasonally adjusted, for example to reflect "back to school" demands. For descriptive convenience, all such seasonal adjustments are encompassed here by the term "holiday." For example, the point-of-sale system 140 may have checked out, on historical average, ten units of the item 122 in past fifteen minute periods between 11:00 and 12:00 and twenty units of the item 122 in past fifteen-minute periods between 12:00 and 13:00 on Mondays, Wednesdays, and Fridays; and three units of the item 122, on average, during other past fifteen minute periods between 08:00 and 18:00 on Mondays, Wednesdays, and Fridays; and six units of the item 122 during past fifteen-minute periods on Tuesdays and Thursdays. For an on-line order received at 11:18 on a Monday according to this example, the quantity-held estimate 127 would be ten; for an on-line order received at 15:42 on Thursday, the quantity-held estimate 127 would be six.

Figure 2:
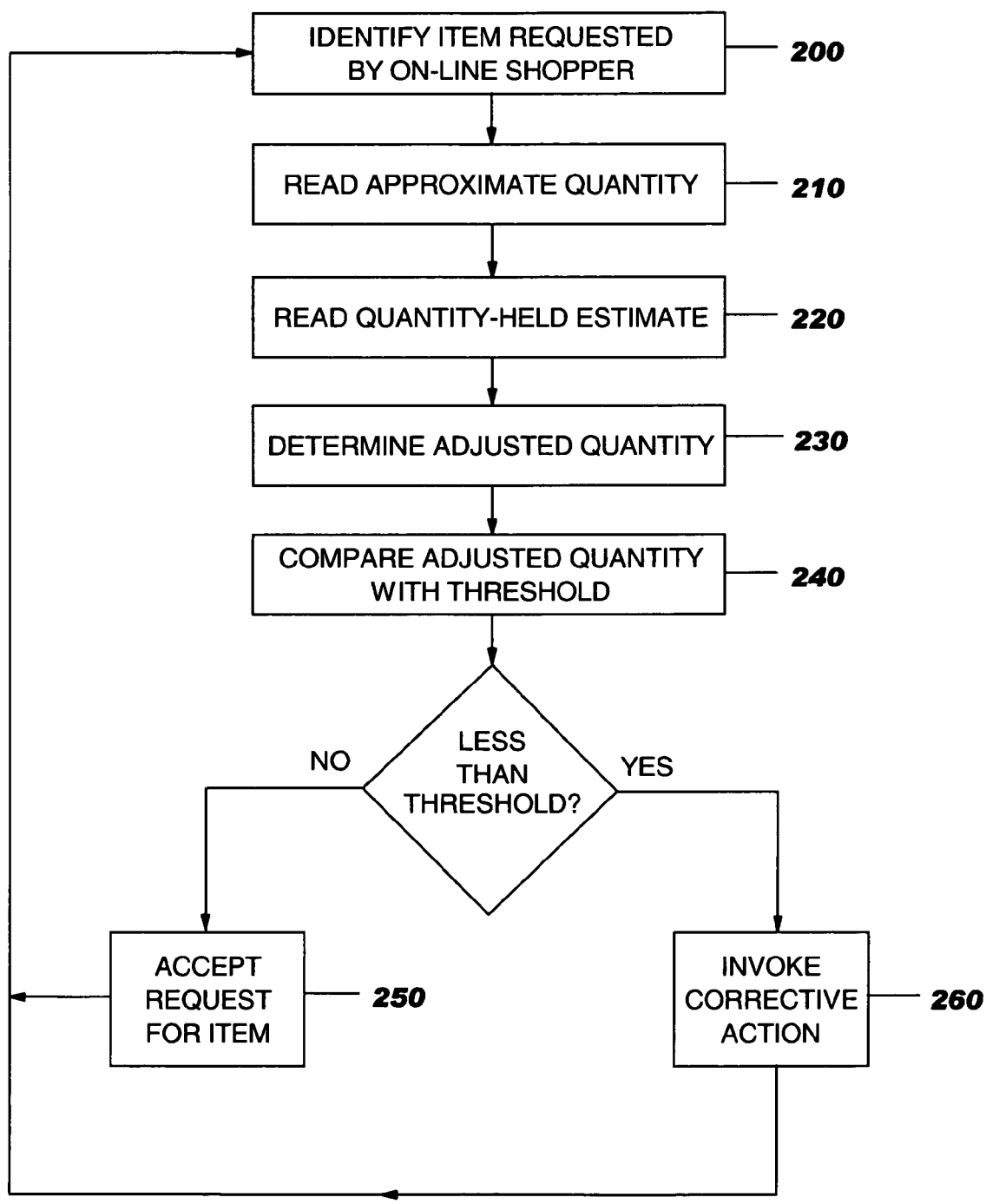
FIG. 2 shows aspects of the operation of a method according to the present invention, suitable for use with the exemplary structure of FIG. 1.

FIG. 2 illustrates an exemplary method according to the invention that is applicable to the exemplary structure shown in FIG. 1. As shown in FIG. 2, the server 115 identifies the item 122 requested (i.e., selected or otherwise put into the electronic shopping cart 102, or ordered, and so forth) by the on-line shopper 100 (step 200). The server 115 or other logic within the merchant 110 then reads the approximate quantity 126 of the item 122 (step 210), and the quantity-held estimate 127 (step 220). The server 115 or other logic within the merchant 110 then determines the adjusted quantity, which is an approximation of the number of the item 122 available for purchase by on-line shoppers. The adjusted quantity is found by adjusting the approximate quantity 126 responsive to the quantity-held estimate 127 (step 230). For example, the adjusted quantity may be determined by subtracting the quantity-held estimate 127 from the approximate quantity 126. As an alternative to the exemplary method of FIG. 2, the adjusted quantity may be determined ahead of, or independently of, the identifying step shown in FIG. 2. For example, the adjusted quantity may be determined at specified times or in recognition of specified events such as changes in the approximate quantity caused by purchases by in-person shoppers.

As shown in FIG. 2, the server 115 or other logic then compares the adjusted quantity with a predetermined threshold (step 240). In a preferred embodiment of the invention, the predetermined threshold is one unit. If the adjusted quantity equals or exceeds the threshold, the merchant 110 accepts the request by the on-line shopper (step 250), and returns to identify the next item requested by the on-line shopper 100 (step 200). Otherwise (i.e., the adjusted quantity is less than the threshold), the server 115 or other logic within the merchant 110 invokes a corrective action (step 260), and returns to identify the next item requested by the on-line shopper 100 (step 200).

In various embodiments of the invention, the corrective action may include, for example, prompting the on-line shopper 100 to select an alternative to the item 122 (here, the term "alternative item" includes as well a back-up item that serves as an alternative when the primary item is in fact not available); asking the on-line shopper 100 to submit an order immediately so that the item 122 may be removed from the stock 120 and set aside on behalf of the on-line shopper 100; monitoring the approximate quantity 126 during the course of the on-line shopping session and informing the on-line shopper 100 if the approximate quantity 126 falls below a second threshold (which is zero units in a preferred embodiment), thereby indicating that the item 122 is no longer available; instructing the in-house shopping assistant 130 to reserve the item 122 for the on-line shopper 100; and so forth.

From the foregoing description, those skilled in the art will appreciate that the present invention provides a more dependable way for a click-and-mortar merchant who offers both on-line and in-person shopping to advise an on-line shopper about the from-stock availability of an item that may be removed from stock by an in-person shopper. The foregoing description is, however, illustrative rather than limiting, and the scope of the present invention is limited only by the following claims.

I claim:

1. A method of operating a combined on-line and physical retail store for an on-line shopper, comprising the steps of:
   receiving at a web server an order for an item by an on-line shopper;
   determining via the server a real time approximate quantity of the item available for purchase by the on-line shopper;
   adjusting via the server the real time approximate quantity responsive to a quantity-held estimate of a number of units of the item held by in-person shoppers who physically removed said units of the item from inventory prior to checkout by the in-person shoppers to provide an adjusted quantity;
   comparing via the server the adjusted quantity with a first threshold; and
   when the adjusted quantity is less than the first threshold, invoking a corrective action.

2. The method of claim 1, wherein the quantity-held estimate is dependent upon an average number of the item purchased historically during a specified period of time.

3. The method of claim 1, wherein the quantity-held estimate is dependent upon a time of day.

4. The method of claim 1, wherein the quantity-held estimate is dependent upon a day of a week.

5. The method of claim 1, wherein the quantity-held estimate is dependent upon proximity to a holiday.

6. The method of claim 1, wherein the step of invoking includes the steps of monitoring the approximate quantity when the adjusted quantity is less than the first threshold, and informing the on-line shopper when the approximate quantity falls below a second threshold.

7. A computer program product for instructing a server to operate a combined on-line and physical retail store, the computer program product comprising:
   a computer readable medium;
   first program instruction means for receiving at a web server an order for an item by an on-line shopper;
   second program instruction means for determining via the server a real time approximate quantity of the item available for purchase by the on-line shopper;
   third program instruction means for adjusting via the server the real time approximate quantity responsive to a quantity-held estimate of a number of units of the item held by in-person shoppers who physically removed said units of the item from inventory prior to checkout by the in-person shoppers to provide an adjusted quantity;
   fourth program instruction means for comparing via the server the adjusted quantity with a first threshold; and
   fifth program instruction means for when the adjusted quantity is less than the first threshold, invoking a corrective action; and wherein
   all said program instruction means are recorded on said medium.

8. A method of deploying process software for operating a combined on-line and physical retail store, the method comprising:
   installing the process software on a web server; and
   invoking the process software to perform the steps of:
   receiving at a web server an order for an item by an online shopper;
   determining via the server a real time approximate quantity of the item available for purchase by the on-line shopper;
   adjusting via the server the real time approximate quantity responsive to a quantity-held estimate of a number of units of the item held by in-person shoppers who physically removed said units of the item from inventory prior to checkout by the in-person shoppers to provide an adjusted quantity;
   comparing via the server the adjusted quantity with a first threshold; and
   when the adjusted quantity is less than the first threshold, invoking a corrective action.

* * * * *